United States Patent
Noguchi

[11] 3,917,379
[45] Nov. 4, 1975

[54] OPTICAL IMAGE REPRODUCING SYSTEM FOR A HOLOGRAM USING A LINEAR WHITE LIGHT SOURCE

[75] Inventor: Masaru Noguchi, Asaka, Japan
[73] Assignee: Fuji Photo Film Co., Ltd., Minami-ashigara, Japan
[22] Filed: Sept. 11, 1974
[21] Appl. No.: 504,945

[30] Foreign Application Priority Data
Sept. 11, 1973 Japan.............................. 48-102335

[52] U.S. Cl. ............................ 350/3.5; 350/162 SF
[51] Int. Cl.² ...................... G03H 1/28; G03H 1/24
[58] Field of Search ....... 350/3.5, 162 SF, 190, 199; 240/41.3, 41.35 R, 41.35 E

[56] References Cited
UNITED STATES PATENTS
| | | | |
|---|---|---|---|
| 2,356,654 | 8/1944 | Cullman.............................. | 240/41.3 |
| 3,633,989 | 1/1972 | Benton................................. | 350/3.5 |
| 3,834,786 | 9/1974 | Carlsen................................ | 350/3.5 |

Primary Examiner—Ronald J. Stern
Assistant Examiner—Jon W. Henry
Attorney, Agent, or Firm—Sughrue, Rothwell, Mion, Zinn & Macpeak

[57] ABSTRACT

An optical image reproducing system for a hologram comprising a white-light linear light source for radiating a white light beam in a line shape, an image hologram of a non-diffuse type having optical information of an object stored therein by means of a coherent light beam for producing, when irradiated by the white light beam of linear light source, an optical image of the object without any substantial scatter, a screen of the scattering type, which is positioned substantially in parallel with the image hologram and at the opposite side to the linear light source for scattering an incident light beam to such an extent as to reproduce a visual optical image which is viewable at different points, and a projecting lens interposed between the image hologram and the scattering type screen for projecting the optical image of the hologram on the screen. The projected optical image can desirably be colored with the use of a color image hologram and by interposing between the image hologram and the projecting lens a shielding plate, which is formed with a slit which extends in the lengthwise direction of the linear light source.

1 Claim, 5 Drawing Figures

SPECTRUM OF DIFFRACTED LIGHT BEAM HAVING THE WAVELENGTH $\lambda_0$

SPECTRUM OF DIFFRACTED LIGHT BEAM HAVING THE WAVELENGTH $\lambda_1$

SPECTRUM OF DIFFRACTED LIGHT BEAM HAVING THE WAVELENGTH $\lambda_2$

OPTICAL IMAGE REPRODUCING SYSTEM FOR A HOLOGRAM USING A LINEAR WHITE LIGHT SOURCE

BACKGROUND OF THE INVENTION

1. Field of the Invention

The present invention relates to an optical image reproducing system for a hologram, and more particularly to an optical image reproducing system which can be used to increase the brightness of the reproduced optical image recorded on an image hologram of a non-scattering, i.e., non-diffuse type.

2. Description of the Prior Art

As is well known in the art, one of the greatest disadvantages concomitant with an optical image reproducing method for a hologram is that the ratio (which is hereinafter referred to as the "diffraction efficiency") of the portion of the energy of the light beam diffracted by the hologram for image reproduction which is attributable to the optical image to be reproduced to the total energy of the light beam is so small that a sufficiently bright reproduced optical image cannot be obtained. This results in highly restricted applications of the optical image reproducing method using a hologram.

Considering especially visual education in which it is desired to project and display the reproduced optical image in an enlarged scale upon a screen of the scattering type and to allow many people to simultaneously observe the displayed optical image, the possibility of success using current methods of reproducing the optical image on the hologram has been determined to be hopeless.

One conventional method for improving the diffraction efficiency of the hologram is to fabricate the so-called "phase type hologram," in which the holographic information is recorded in different phases. In using a silver halide photographic emulsion, for example, a phase type hologram of gelatin and the silver salt is prepared by subjecting the so-called "absorption type" hologram (which is also called an "amplitude type" hologram) made of gelatin and silver to a bleaching treatment. However, the diffraction efficiency of the hologram thus obtained is usually about 30% at the highest for a hologram of a simple grid structure, on which information of a simple point only is recorded, and is reduced to several percent for a hologram on which integrated information of infinite points is recorded just like an ordinally extended object.

Another method for obtaining a phase type hologram is to use a recording medium such as gelatin bichromate, a photo resist or lithium niobate. In this method, however, the application is highly restricted by the fact that the gelatin bichromate does not possess a sufficiently long life time before use. For a hologram using a photoresist, on the other hand, disadvantageously the photosensitive wavelength range is limited to a wavelength ranging from about 200 to 500 m$\mu$. For a hologram using lithium niobate, moreover, the disadvantage is that its photosensitivity is remarkably low. Continuous research has been conducted for other recording materials of the phase type, but at this stage no material appears to be promising.

On consideration of the applicability of a variety of recording materials thus far obtained, it cannot but be concluded that some strict limitations exist in improving the diffraction efficiency of the hologram. With this in mind, in order to improve the brightness of the optical image reproduced from the hologram, it is considered necessary to look for a method other than the method contemplating to improve the diffraction efficiency.

In a current process for reproducing an optical image from a hologram, a laser beam is used as a coherent light source. It is not, however, practical to employ a laser beam light source having a high output to increase the brightness of the optical image reproduced because a laser light source of a high output now obtainable is so complicated that it is large in size and is accordingly expensive. Especially in the case where a color image is to be obtained from a color hologram using polychromatic laser light sources, the foregoing drawbacks resultantly restrict the applicability of the color image reproducing method to a marked extent.

One very bright and powerful light source other than that of laser type used to reproduce an optical image from a hologram is, for instance, a high pressure mercury vapor lamp or a short arc xenon discharge lamp, which has such a small illuminative portion that it can be considered to be a point light source. The wider the effective area of the illuminative portion of the light source is, the more the reproduced image becomes blurred. In this respect, when a high pressure mercury vapor lamp or a xenon discharge lamp has a larger radiative output, it has a wider illuminative portion, so that its adaptability as a reproducing light source for a hologram is degraded.

SUMMARY OF THE INVENTION

It is, therefore, an object of the present invention to provide an optical image reproducing system for a hologram, which uses a white light source of high radiation and output in reproducing an image hologram of the non-scattering, i.e., non-diffuse type to obtain a reproduced optical image of sufficient brightness.

Another object of the present invention is to provide an optical image reproducing system which can also use a remarkably small and inexpensive white light source in reproducing the image hologram to nevertheless obtain an optical image of sufficient brightness.

According to a primary aspect of the present invention, an optical image reproducing system for a hologram is provided which comprises a white-light line, i.e., linear, light source for radiating a white light beam in a line shape, an image hologram of a non-scattering (non-diffuse) type having optical information of an object stored therein using a coherent light beam for producing, when irradiated by the white light beam of the line light source, an optical image of the object without any substantial scatter, a screen of a scattering type positioned substantially in parallel with the image hologram and at the opposite side thereof to the line light source for scattering an incident light beam to such an extent as to reproduce a visual optical image which is viewable at different points, and a projecting lens interposed between the image hologram and the screen for projecting the optical image of the image hologram on the screen.

BRIEF DESCRIPTION OF THE DRAWINGS

These and other objects and advantages of the present invention will become apparent from the following description taken in connection with the accompanying drawings.

DESCRIPTION OF THE PREFERRED EMBODIMENTS

In the present invention, the term "white-light line light source" is defined to mean a light source which can radiate a plurality of line spectra in the visible wavelength range or a continuous spectrum in a desired area of the visible wavelength range, and whose radiative portion can be deemed substantially a "line" having a width smaller than 3 mm and a length larger than 10 mm. One representative example of such a white-light line light source is a halogen lamp, in which a tungsten filament in the form of a coil having a diameter of about 2 mm and a length of about 20 mm glows white in the atmosphere of iodine gas.

In the present invention, moreover, the term "image hologram of the non-diffuse or non-scattering type" is defined to mean a hologram, in which an optical image of an object produced by irradiating the object using a non-scattering, i.e., non-diffuse, coherent, monochromatic laser beam is formed and recorded.

In the present invention, on the other hand, the term "color image hologram of the non-diffuse or non-scattering type" is defined to mean a color hologram, in which a color image of a polychromatic object produced by irradiating the object using at least two non-scattering, i.e., non-diffuse monochromatic laser beams of different wavelengths is recorded in a composite manner.

In the present invention, still moreover, the term "screen of the scattering type" is defined to mean a screen, which scatters an incident light beam to such an extent as to reproduce a visual optical image which is viewable to observers at different points. A screen of this type may include a screen of the transmission type or of the reflection type.

The present invention will now be described in detail in conjunction with the accompanying drawings.

Figure 1:
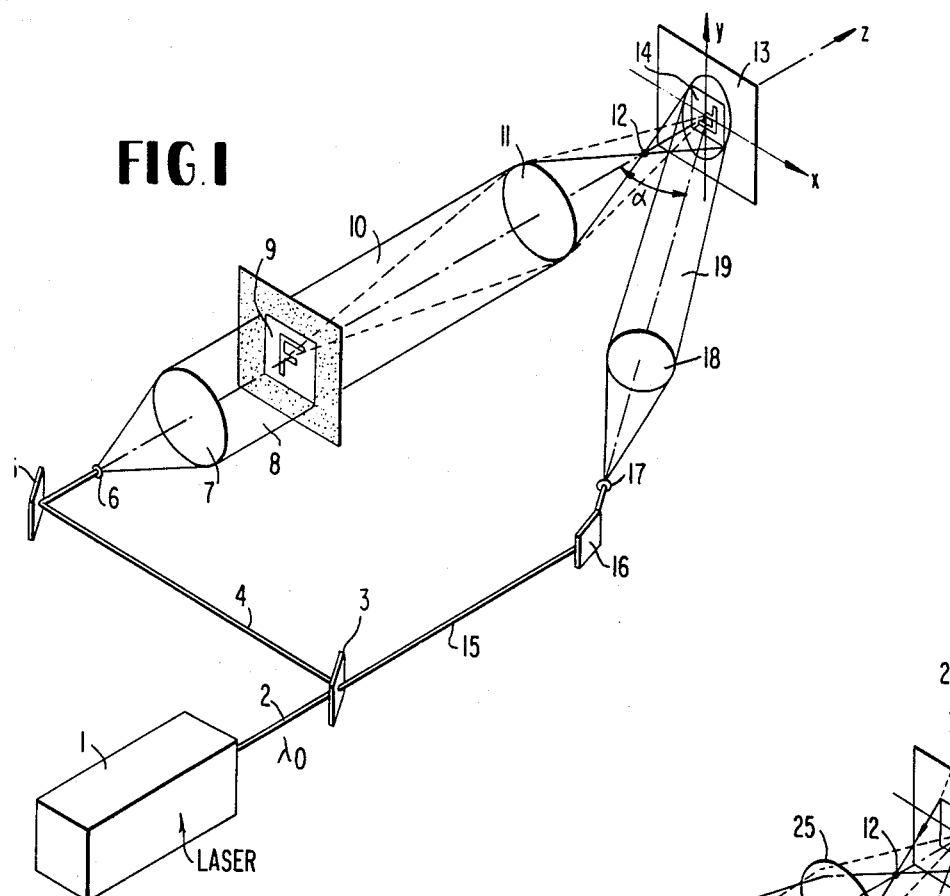
FIG. 1 is a diagrammatical view explaining a recording system used in the present invention to record an optical image on a hologram.

FIG. 1 is a diagrammatical view showing one embodiment for recording an optical information on an image hologram of the non-scattering type which is to be used in the present invention.

As is shown in FIG. 1, a monochromatic light beam 2, which is obtained from a laser light source 1 and having a spatially coherent wavelength $\lambda_0$, is divided by a half-transparent mirror 3 into two light beams 4 and 15. Light beam 4, which is reflected by the half-transparent mirror 3, is then reflected by a reflecting mirror 5. The light beam 4 thus reflected is then changed by the actions of lenses 6 and 7 into a parallel beam 8 having an enlarged beam diameter, to illuminate a transmissive object 9 of the non-scattering type. After light beam 10 having passed through the object 9 is focussed by the action of a lens 11 at a principal focus 12, the light beam 10 is guided into the surface of a hologram 13 so as to form an optical image 14 of the object 9 on the hologram surface 13 as a signal light. Here, it is assumed that the hologram surface 13 is positioned on an $x - y$ plane and that the signal light is directed along the z axis, namely, the line normal to the hologram surface 13. Then, the light beam 15 having passed through the half-transparent mirror 3 is reflected by a reflecting mirror 16 and is magnified by lenses 17 and 18 into a parallel beam 19, which will be guided as a reference beam onto the hologram surface 13. The reference beam thus obtained will be incident upon the hologram surface 13 at a suitable angle of $\alpha$ with respect to the z axis. If, therefore, the hologram is subjected to the recording process in this way, a desired image hologram of the non-scattering type can be obtained.

Figure 2:
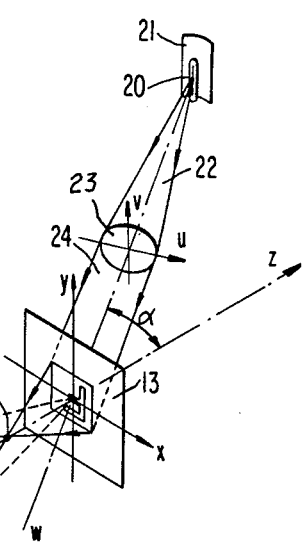
FIG. 2 is similar to FIG. 1 but shows an optical image reproducing system for a hologram according to the present invention for obtaining a reproduced monochromatic image.
Figure 2:
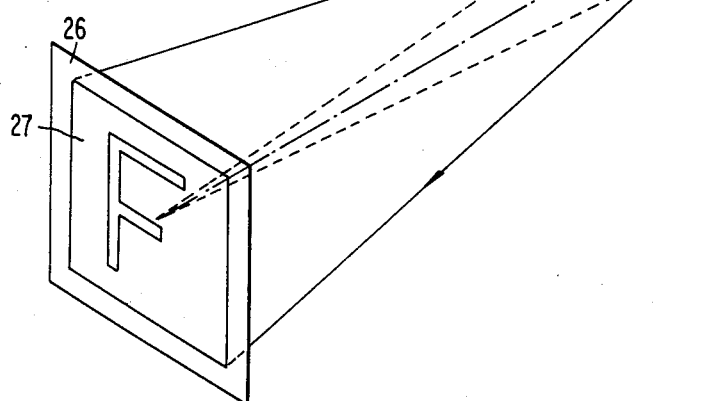

FIG. 2 is an illustrative view showing one embodiment, in which the image on a hologram of the non-diffuse or non-scattering type recorded by the above-described method is reproduced by the optical image reproducing system according to the present invention.

As shown, a white-light line light source 20, for example, a halogen lamp which has a coil-shaped tungsten filament, is so arranged that its longitudinal direction is oriented normally to the $x - z$ plane. At the rear of the white light source 20 (or at the opposite side of the hologram), there may desirably be provided a cylindrical cold mirror 21 which has such a curvature as to reflect the incident visible light back toward the irradiating portion.

The white light beam 22 emanating from the white light source 20 is changed to a parallel beam 24 along the w-axis by a collimating lens 23 and then is incident upon the hologram 13 at an angle of $\alpha$ with respect to the z-axis. The beam 24 is, however, not a completely parallel beam, because it scatters with relation to length of the light source 20, although it is approximately parallel with relation to u-axis.

Figure 3:
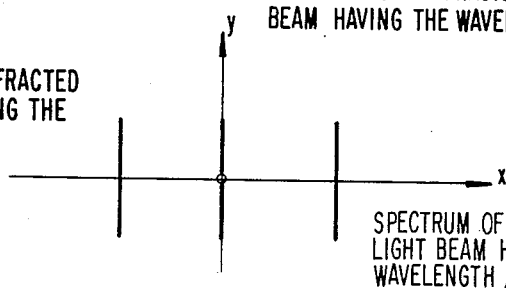
FIG. 3 is an explanatory view showing the characteristics of the diffracted visible spectrum obtained by the optical image reproducing system according to the present invention.

When an image hologram of the non-diffuse or non-scattering type (which will be referred hereinafter as a hologram, for brevity) is illuminated in the manner as described above, a diffracted light beam including the object information is reproduced from the hologram 13. Now, let it be assumed that the light beam emanating from the white light source 20 includes light components which have the wavelength $\lambda_0$ of the laser light used upon the recording of the hologram, a wavelength $\lambda_1$ longer than $\lambda_0$, and a wavelength $\lambda_2$ shorter than $\lambda_0$. With these assumptions, the diffracted light beam having the wavelength $\lambda_0$ will appear at a point 12 in the z-axis, while those light beams having wavelengths $\lambda_1$ and $\lambda_2$ longer and shorter than $\lambda_0$, respectively, will appear at both sides of the point 12 because of the difference in the diffraction angle. Generally speaking, a light beam having a longer wavelength will have a larger diffraction angle. Moreover, it should be noted that the diffracted light beam of any wavelength has a shape which extends in its longitudinal direction (namely, in the direction of the y-axis) corresponding to the length of the white light source 20. The spectrum of the diffracted light beam, appearing on the plane normal to the z-axis including the point 12, will be diagrammatically as shown in FIG. 3, as viewed from the left-hand side of FIG. 2. As will be easily understood, if the light beam emanating from the white light source 20 has a continuous spectral distribution including the component of the wavelength , then the spectrum of the diffracted light beam as shown in FIG. 3 will become continuous in the transverse direction (or in the $x$-direction).

As has been described above, the diffracted light beam reproduced from the hologram 13 is guided by a projecting lens 25 onto a scattering screen 26 which is arranged on a conjugate plane with the hologram surface 13 with respect to the projecting lens 25, thus forming a reproduced image 27 of the object 9. Although the spectrum of the diffracted light beam is spatially separated as shown in FIG. 3, the reproduced image 27 is composed of all of the diffracted light beam spectra and the image on the hologram 13 is focussed by the projecting lens 25 upon the screen surface 26, so that the reproduced images of all the diffracted light beam spectra have their dimensions and locations completely coincident to one another. In this way, the reproduced image 27 is reconstructed of all of the irradiated spectra of the white light source 20, and therefore it is a quite natural black-and-white image.

In accordance with the present invention, a color picture image can also be reproduced with ease from a color image hologram of the non-diffuse or non-scattering type bearing thereon optical information concerning a polychromic object.

The recording process of the color image hologram of the non-diffuse or non-scattering type can be carried out using an optical system similar to that of FIG. 1. In this case, the laser light source 1 is replaced by a polychromatic laser light source. This polychromatic laser light source desirably is composed of the three primary colors, namely, blue, green and red colors, and can be either a krypton ion laser or a combination of an argon ion laser and a helium-neon laser. The object 9 is in the optical system of FIG. 1 is, on the other hand, replaced by a polychromatic object, and the remaining optical elements are similar to those of FIG. 1. As will be expected as a matter of course, the exposure process can be carried out by the three succeeding steps using three laser beams of three wavelengths, that is, blue, green and red. As an alternative, the exposure process can be carried out in a single step using a laser beam of three wavelengths. In either of these ways, a desired color image hologram of a non-scattering, i.e., non-diffuse, type can be obtained.

Figure 4:
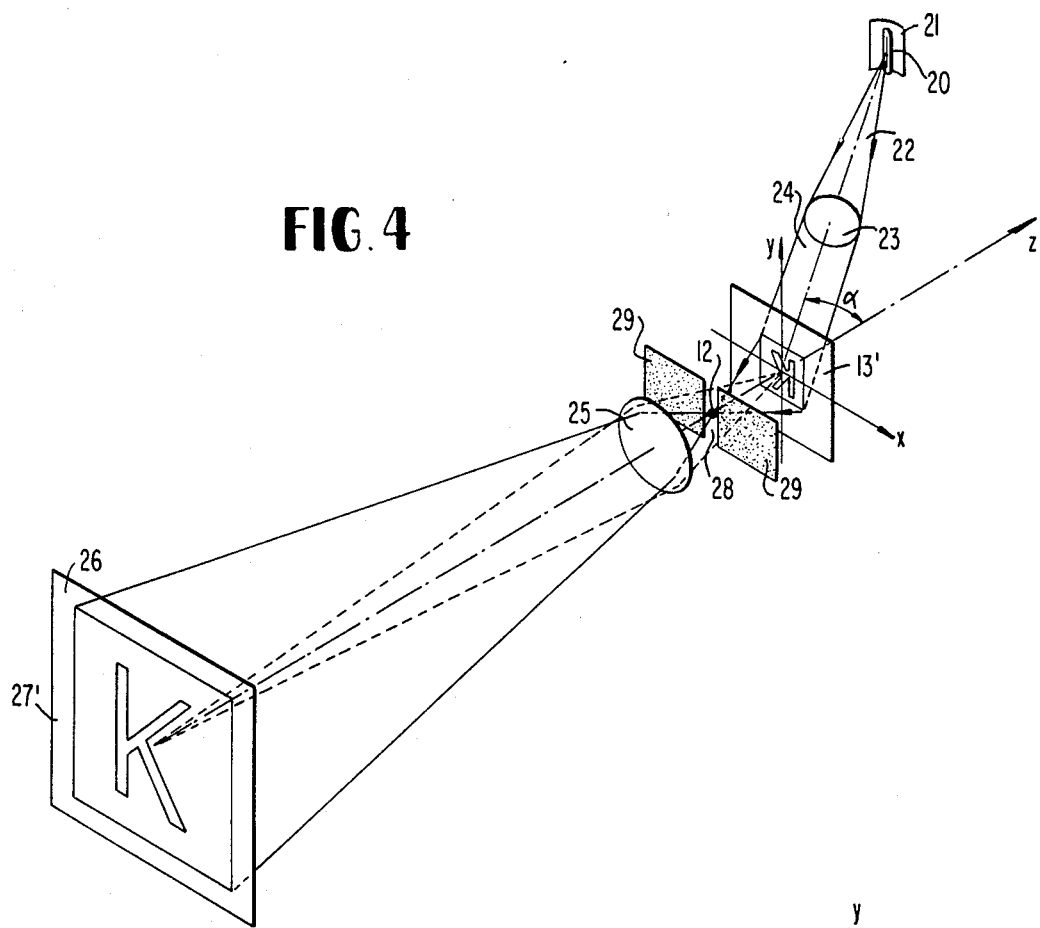
FIG. 4 is similar to FIG. 2 but shows an optical image reproducing system according to the present invention for obtaining a reproduced color image.

It will be assumed here that the laser beam used to record the color image hologram includes three components having wavelengths of $\lambda_B$, $\lambda_G$ and $\lambda_R$ ($\lambda_B$ $\lambda_G$ $\lambda_R$ ). When a color picture image is to be reproduced from a color image hologram having optical information recorded by the above method, a color image hologram 13 of the non-diffuse or non-scattering type is placed in an optical image reproducing system as shown in FIG. 4. The image reproducing system of FIG. 4 is constructed similar to that of FIG. 2, and, with such being the case, like optical elements are numbered similarly. Here, it should be noted that the white-light line light source 20 can radiate a light beam, which is composed of three laser beams of wavelengths $\lambda_B$, $\lambda_G$ and $\lambda_R$ used to accomplish recording of the color image hologram, and which may desirably radiate a continuous spectrum within the entire visible wavelength range.

On the other hand, the difference between the optical image reproducing systems of FIGS. 4 and 2 is that a shielding plate 29, which is formed with a slit 28 extending in the lengthwise direction of the line light source 20, is arranged on a spectral plane of the diffracted light beam.

Figure 5:
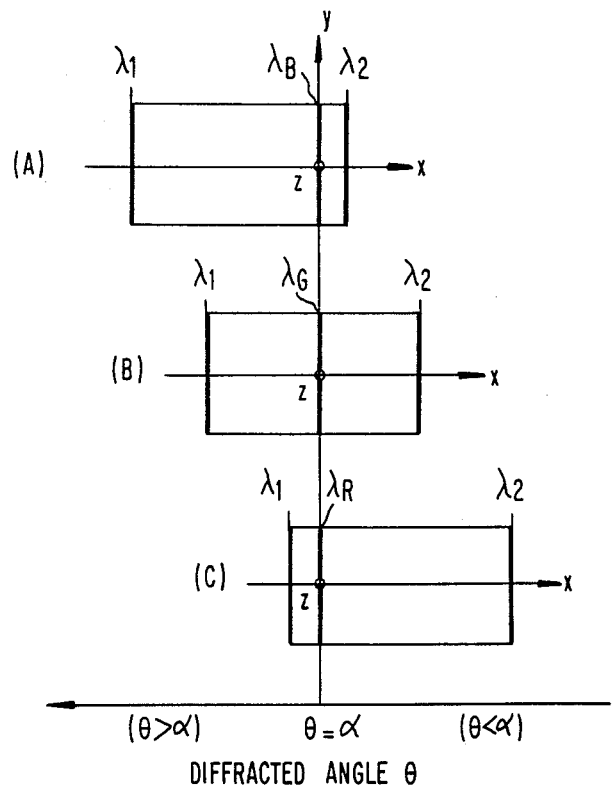
FIG. 5 is similar to FIG. 3 but shows the characteristics of the diffracted visible spectrum obtained by a color image reproducing system according to the present invention.

Turning now to FIG. 5, an explanation will be made as to the diffracted visible spectrum which appears on the spectral plane (namely, the plane passing through the point 12 in the $z$-axis and extending normally to the same axis) of the diffracted light beam of the image reproducing system of FIG. 4. Now let it be assumed that the light beam radiated from the line light source 20 is composed of a continuous spectrum ranging from the wavelength $\lambda_1$ to the wavelength $\lambda_2$, and that the wavelengths $\lambda_B$, $\lambda_G$ and $\lambda_R$ of the three laser beams used to record the color image hologram fall within the wavelength range from $\lambda_1$ to $\lambda_2$.

The color image hologram of the non-diffuse type is composed of three holograms each having the optical information due to the laser beam of the wavelength $\lambda_B$, $\lambda_G$ and $\lambda_R$. As a result, three diffraction light spectra are produced from the color image hologram which is exposed to the white light beam emanating from the white-light line source 20. FIG. 5(A) shows the diffraction light spectrum from the image hologram which has been recorded by means of the laser beam of the wavelength $\lambda_B$, FIG. 5(B) shows the diffraction light spectrum from the image hologram which has been recorded by means of the laser beam of the wavelength $\lambda_G$, and FIG. 5(C) shows the diffraction light spectrum from the image hologram which has been recorded by means of the laser beam of the wavelength $\lambda_R$. In respect of the diffraction light spectrum (A) from the image hologram prepared by means of the laser beam of the wavelength $\lambda_B$, the diffraction light beam of the wavelength $\lambda_B$ will appear in the $z$-axis (namely, at a diffraction angle $\theta = \alpha$), whereas, since the other diffraction light beams of the wavelengths $\lambda_1$ and $\lambda_2$ longer and shorter than the wavelength $\lambda_B$, respectively have their respective diffraction angles $\theta$ larger and smaller than the angle $\alpha$, the diffraction light beams will appear at both sides of the $z$-axis in a separate fashion from each other, as shown in FIG. 5(A). Likewise, both the diffraction light beam of the wavelength $\lambda_G$ of the diffraction light spectrum (B) from the image hologram, which is prepared by means of the laser beam of the wavelength $\lambda_G$, and the diffraction light beam of the wavelength $\lambda_R$ of the diffraction light spectrum (C) from the image hologram, which is prepared by means of the laser beam of the wavelength $\lambda_R$, will appear in the $z$-axis (namely, at a diffraction angle $\theta = \alpha$), and the remaining diffraction light beams will appear at both sides of the $z$-axis in the separate fashion from each other, as shown in FIGS. 5(B) and 5(C). These spectra appearing in the $z$-axis will carry the respective optical information concerning the color components of the wavelengths ($\lambda_B$, $\lambda_G$ and $\lambda_R$) of the polychromatic object. Thus, by placing on the spectral plane of the diffraction light the shielding plate 29 which is formed with the slit-shaped opening 28 whose center is positioned in the $z$-axis, a polychromatically reproduced optical image 27, which reconstructs the color information of the object by means of the light beam of the components having the wavelengths identical to such three primary colors which were used in the recording process, can be displayed on the screen 26.

As is apparent from the foregoing description, according to the present invention, the optical image reproducing system can employ a white-light line light source which can provide sufficient brightness and high output power but which is small in size and inexpensive in cost of production. When, therefore, the optical image reproduced from the color image hologram of a non-scattering, i.e., non-diffuse, type is displayed directly on a screen of the scattering type, it can have a sufficient brightness and contrast which is viewable to the observer under ordinary interior illumination. As a matter of fact, in the Example using the "line-shaped" halogen lamp having an output power of 500 W, the reproduced picture image, which was projected in an A-4 size (21.0 × 29.7 cm) upon the scattering screen, had sufficient brightness and contrast under ordinary interior illumination.

Since, moreover, the optical image reproducing system of the present invention uses a non-scattering image hologram having a hologram surface on which the optical image of the object is focussed, the resolution of the reproduced optical images 27 and 27' are limited by the performance both of the lens 11, which is used to record the hologram, and of the projecting lens 25 which is used in the image reproducing system of the invention. As a result, the resolution thus obtained can make it possible to accomplish a reduction record and magnified projection as is experienced not only in the current microphotography but also in the ultramicrophotography. As a matter of fact, the color image, which is reproduced by projecting in the A-4 size upon a scattering screen an optical image which is reproduced from the non-scattering color image hologram of the size 11 × 8 mm, can provide a sufficient resolution, and can find a variety of promising applications not only in ordinary color microphotography but also in the color ultramicrophotography.

On the other hand, the reproduced optical image, which is obtainable using the conventional image reproducing method for a hologram using a laser beam, has a deteriorated picture quality which is composed of a graininess pattern called a "Speckle Pattern." As a result, the optical image thus obtained is not free from the drawback of eye fatigue of the observer due to the high coherence of the laser beam used. On the contrary, the optical image reproduced by the system of the present invention is formed by superposing a multiplicity of wavelengths, so that the above-described drawbacks are eliminated.

In another conventional method for reproducing an optical image from a hologram by means of white light source, moreover, a hologram of the "Lipmann Type" has been used, but it has such a low diffraction efficiency that it is impossible to project the obtained optical image upon a scattering screen and to observe the same. In another aspect, a hologram of the Lipmann Type is extremely difficult to reproduce. In this respect, however, the non-scattering image hologram used in the present invention can be easily reproduced by a simple method in which the optical contact method or the pressure print method which makes use of the relief of the hologram surface is employed.

From the foregoing description, it should be appreciated that a feature of the present invention is that the optical image on the hologram can be reproduced much more brightly than before.

It should also be appreciated that the reproduced optical image of the hologram can be projected in a large size which can be simultaneously viewed by observers at different points.

It should also be appreciated that, since the system of the present invention does not use a laser beam to become free from "Speckel Pattern" phenomenon, the optical image obtained has an improved picture quality, and that, since the light sources are not coherent, the optical image is free from observer eye fatique.

It should further be appreciated that the optical image reproducing system of the invention can be fabricated at a reduced cost and in a smaller scale in comparison with that of the conventional type.

As has been described in detail before, the present invention enlarges remarkably the field of application of recording and reproducing an optical image by means of a hologram. Therefore, it can be said that the promising application of visual education, in which it is desired to project and display upon a scattering screen a reproduced optical image which is simultaneously viewable by many observers, exists for the first time due to the present invention.

While the invention has been described in detail and with reference to specific embodiments thereof, it will be apparent to one skilled in the art that various changes and modifications can be made therein without departing from the spirit and scope thereof.

What is claimed is:

1. An optical image producing system for a hologram comprising:
   a white-light linear light source for radiating a white light beam having a lengthwise dimension much greater than its width;
   a non-diffuse color image hologram having optical information of a colored object stored therein said hologram having been produced by the interaction of a divergent polychromatic object light beam and a mutually coherent parallel polychromatic reference light beam, for producing, when irradiated by the white light beam of said linear light source, a colored optical image of the object without any substantial scatter;
   a lens interposed between said linear light source and said image hologram and receptive of the white light beam of the linear light source for changing the radiated white light into a parallel white light beam;
   a scattering, positioned substantially parallel to said image hologram and at the opposite side thereof to said linear light source, for scattering an incident light beam to such an extent as to reproduce a visible optical image which is viewable from different directions;
   a projecting lens interposed between said image hologram and said screen for projecting the optical image of said colored object from said image hologram onto said screen; and
   a shielding plate interposed between said image hologram and said projecting lens and formed with a slit which extends in the lengthwise direction of said linear light source, said slit being positioned so that the optical image projected onto said screen contains all the colors used to produce said image hologram.

* * * * *